July 24, 1956 W. A. RINGLER 2,755,961
CELLULAR ARTICLE CARRIERS
Filed March 10, 1953 6 Sheets-Sheet 2
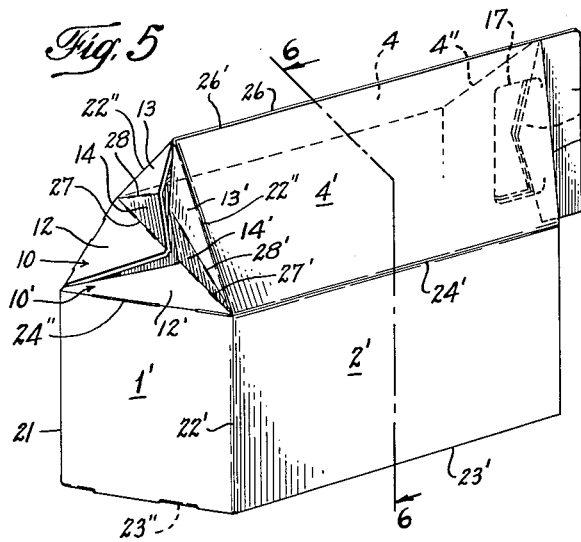
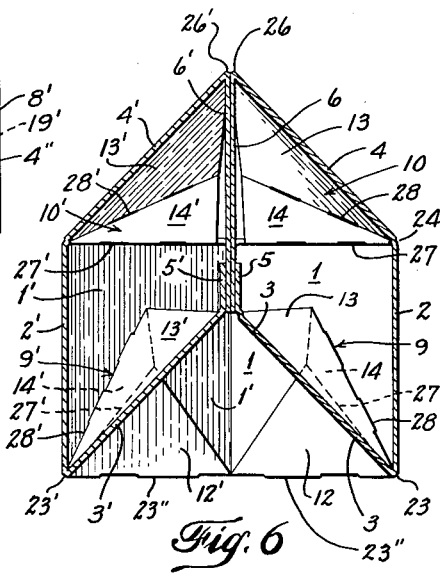
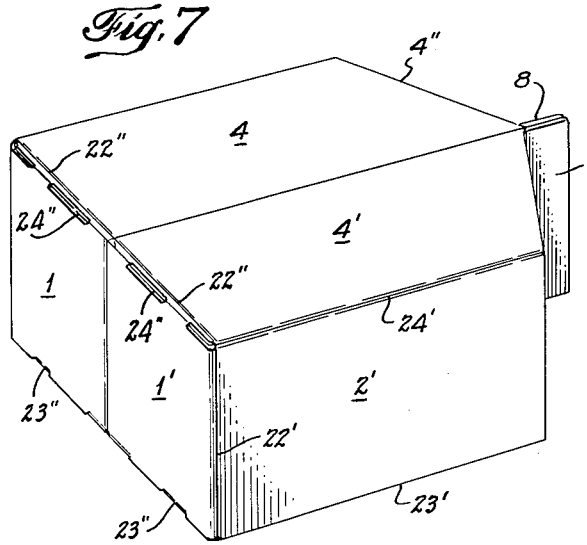
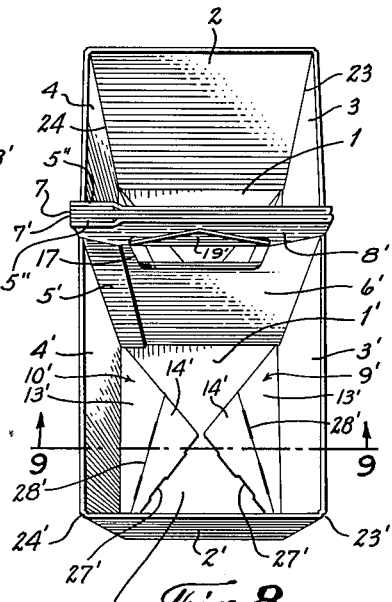
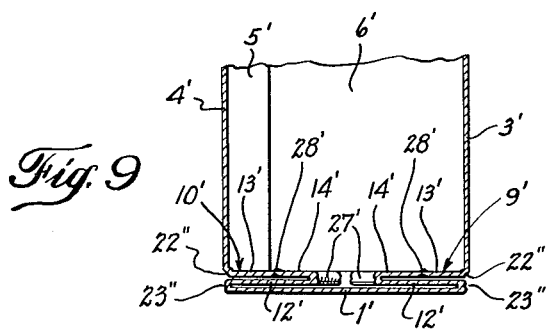
INVENTOR.
WILLIAM A. RINGLER
BY
Reuben J. Carlson
ATTORNEY.

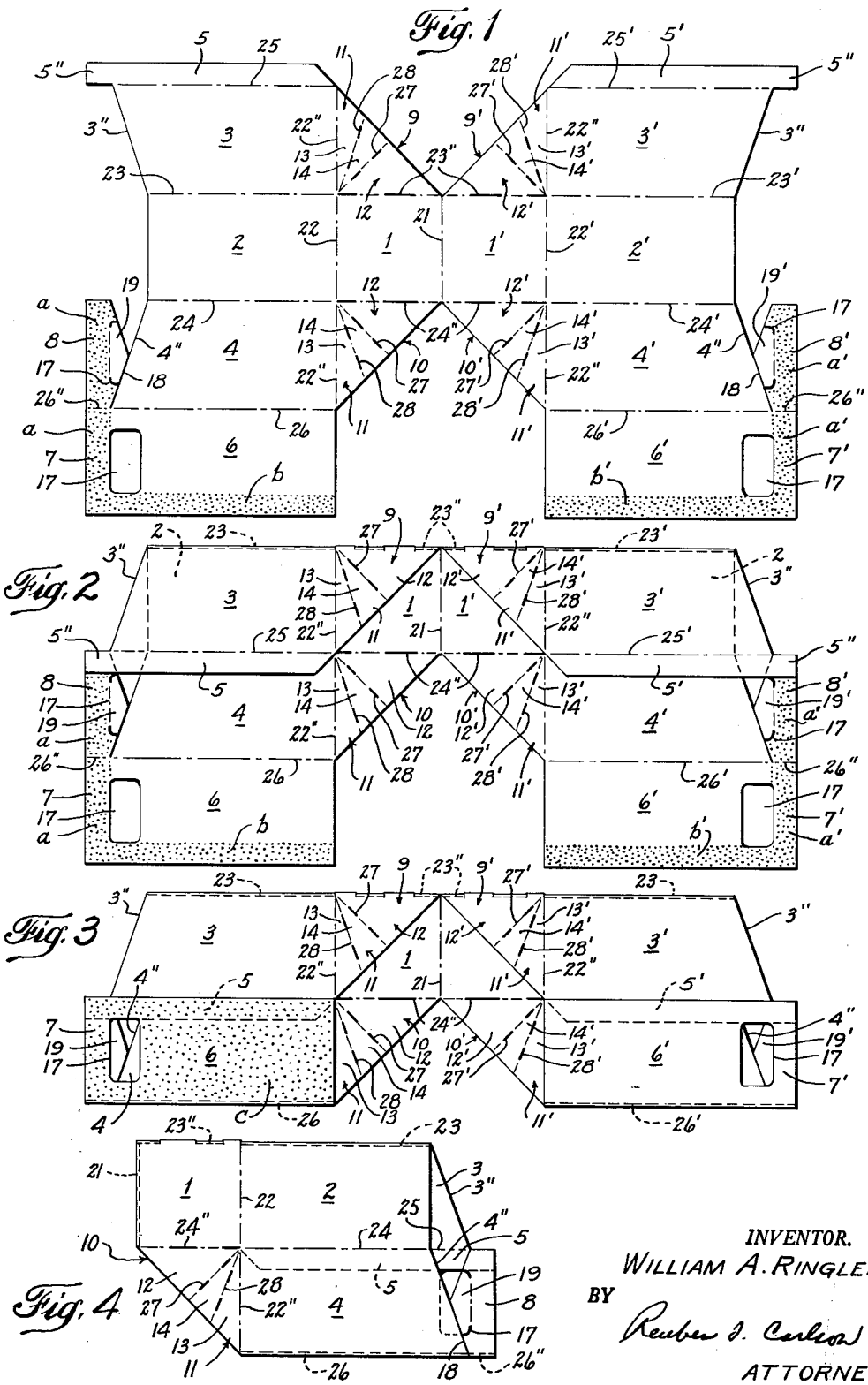

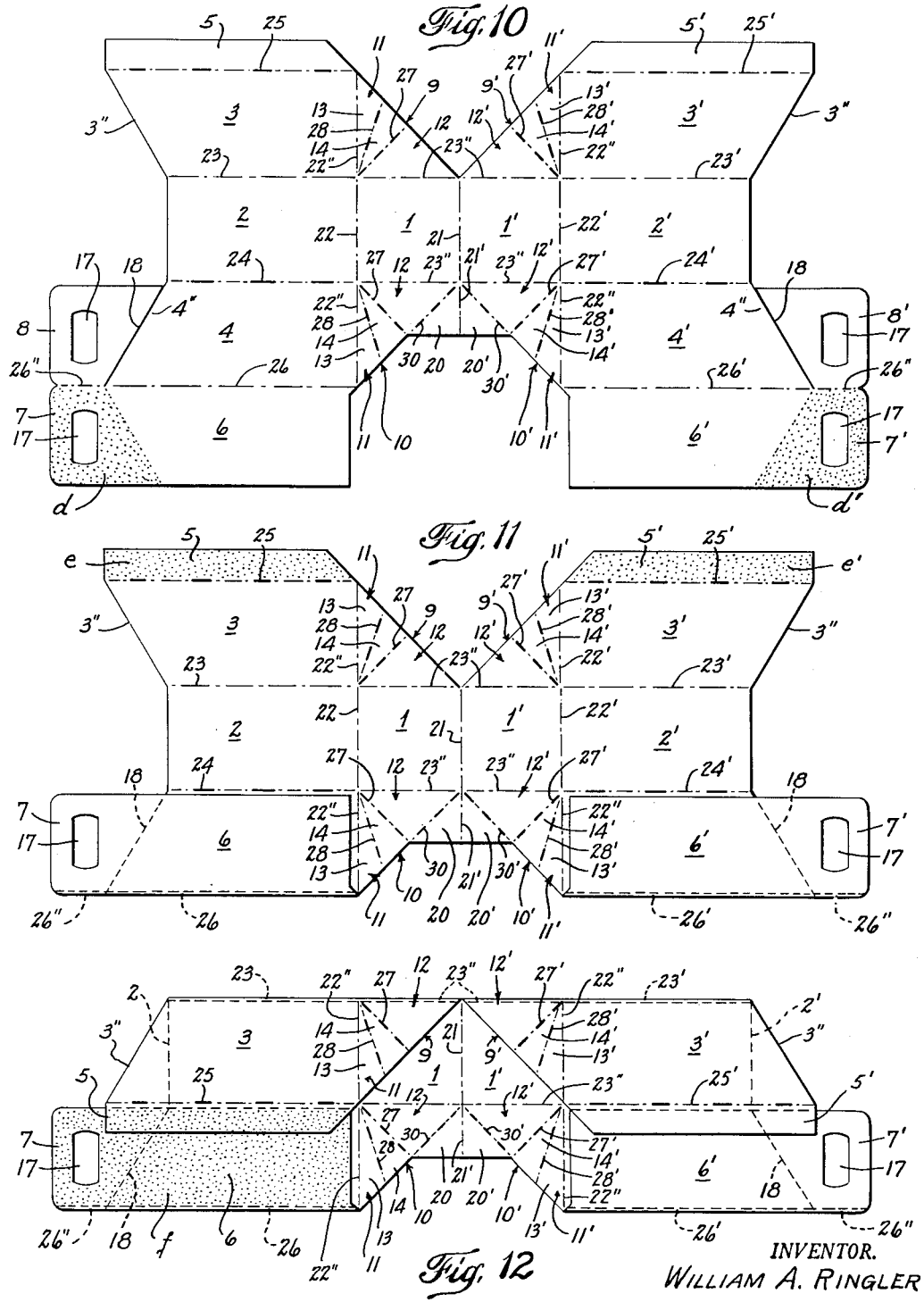

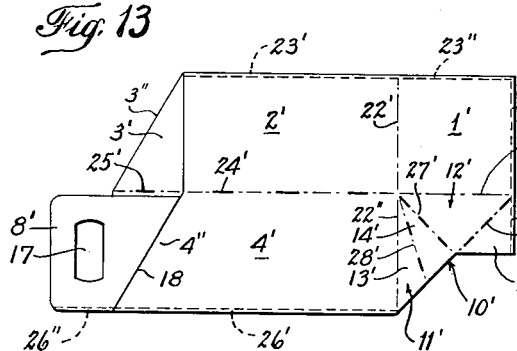
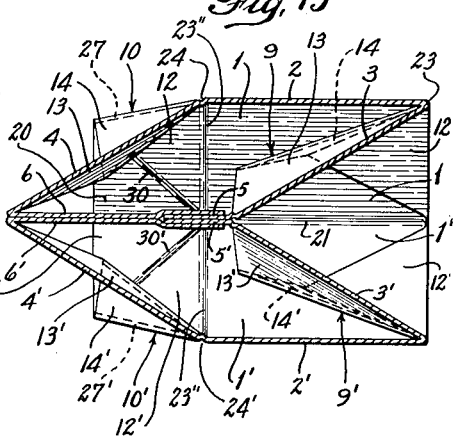
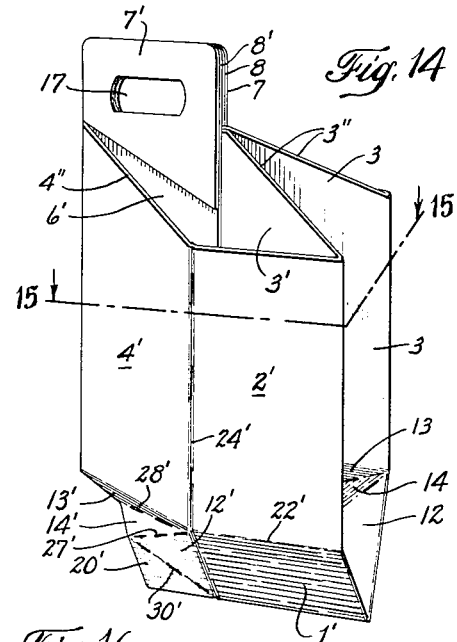
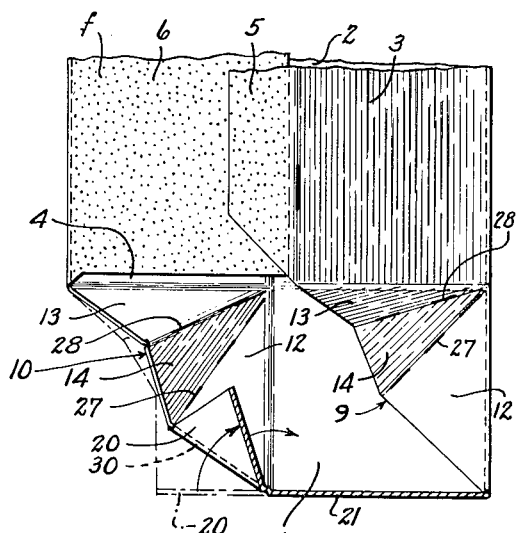
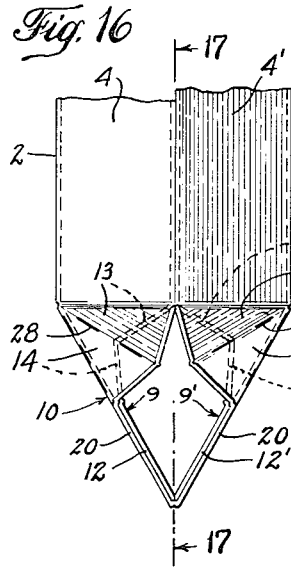
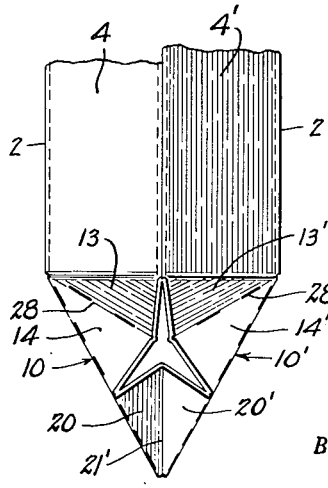

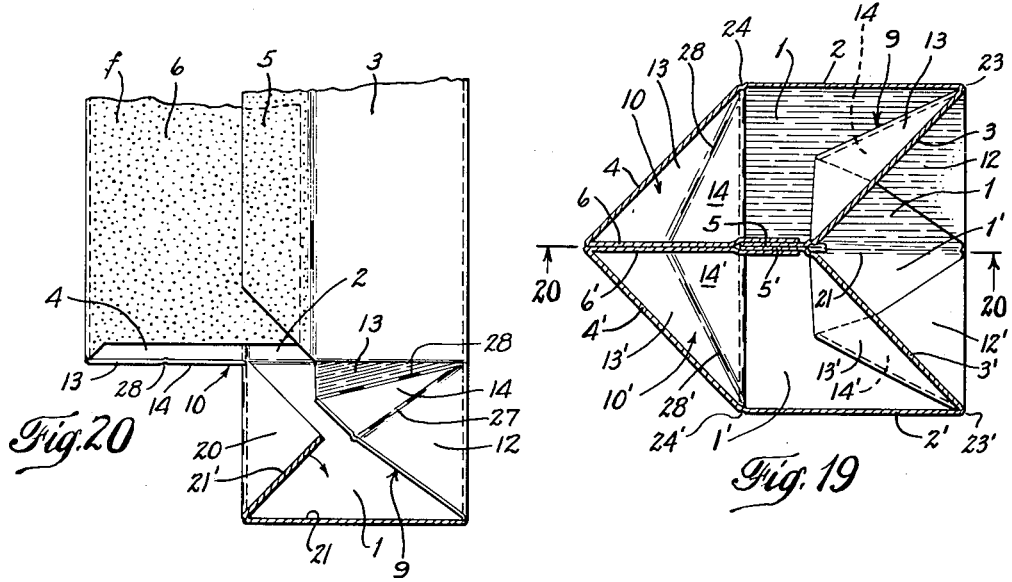
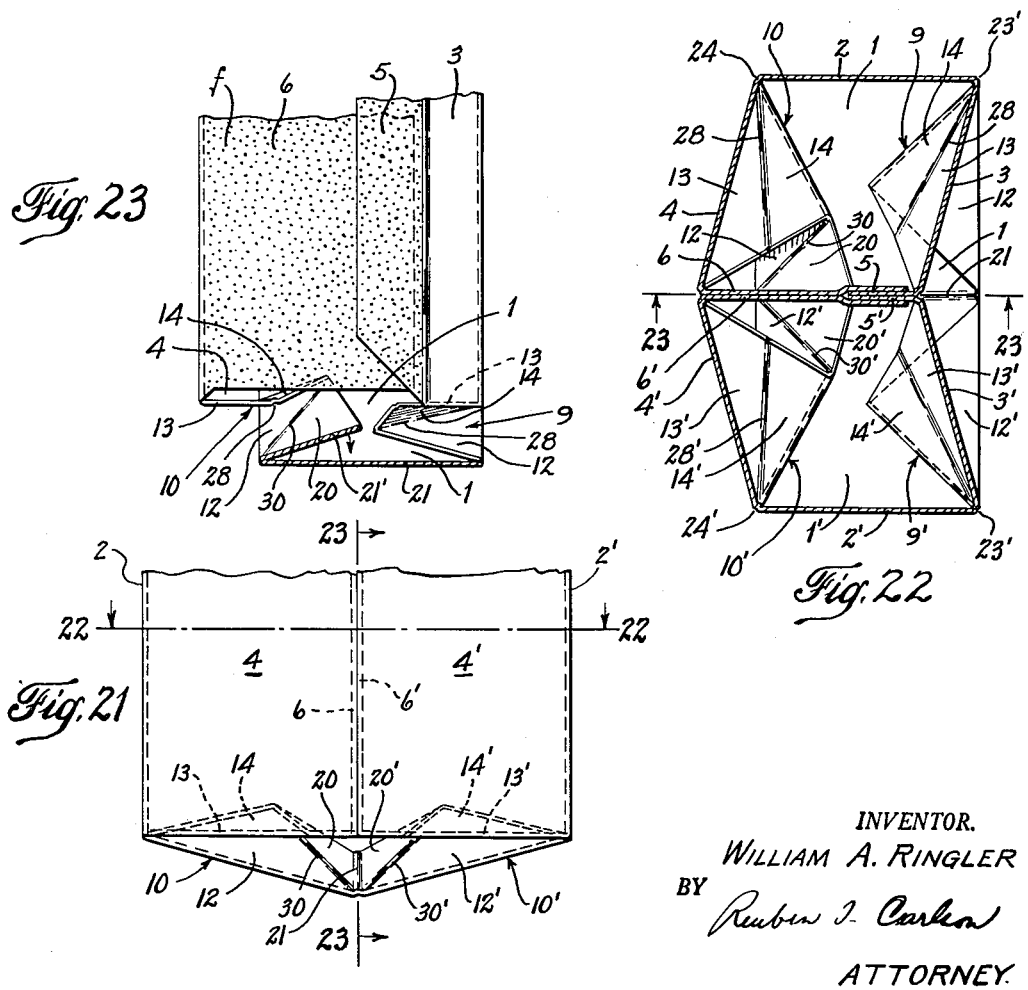

July 24, 1956 W. A. RINGLER 2,755,961
CELLULAR ARTICLE CARRIERS
Filed March 10, 1953 6 Sheets-Sheet 6
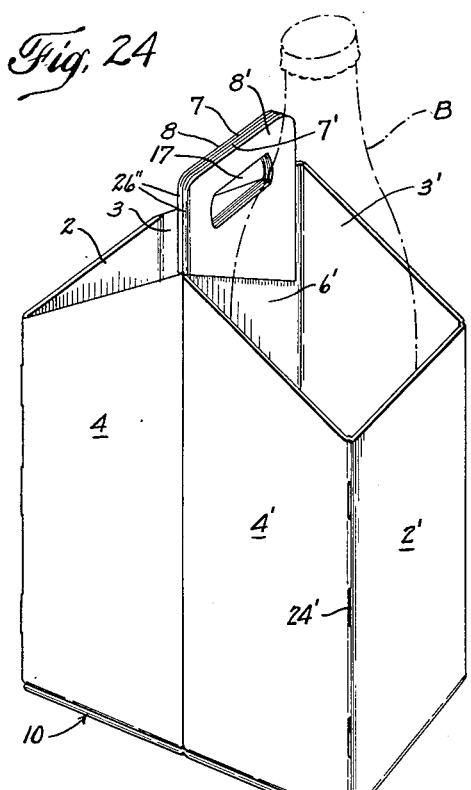
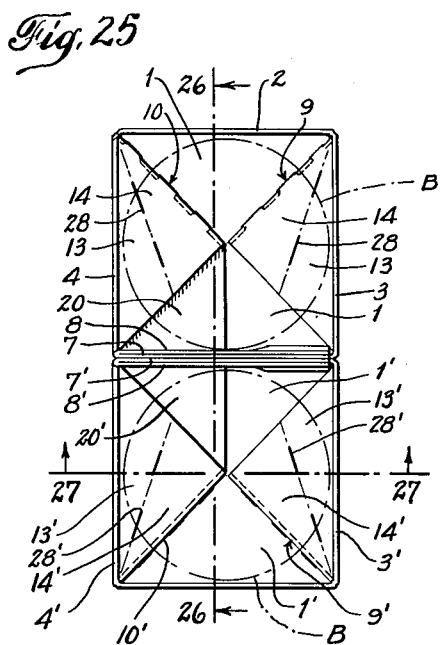
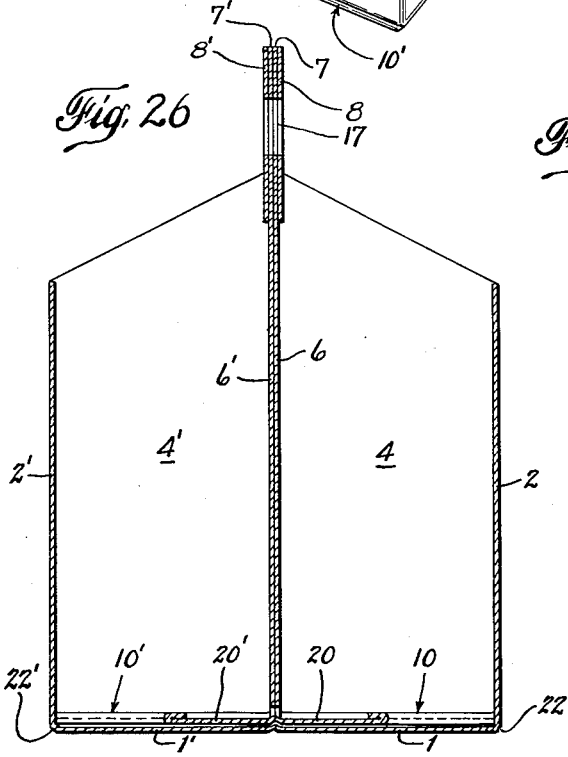
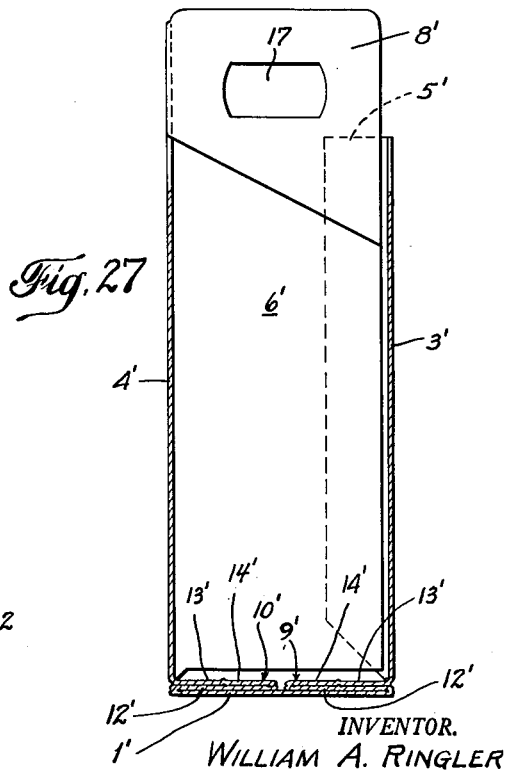
INVENTOR.
WILLIAM A. RINGLER
BY
Reuben J. Carlson
ATTORNEY.

United States Patent Office 2,755,961
Patented July 24, 1956

2,755,961

CELLULAR ARTICLE CARRIERS

William A. Ringler, Wayne, Pa., assignor to The Gardner Board & Carton Co., Middletown, Ohio, a corporation of Ohio Application March 10, 1953, Serial No. 341,477

7 Claims. (Cl. 229—113)

This invention relates to cellular article carriers having reinforced bottom panels designed to support articles of substantial weight.

Article carriers made in accordance with this invention present foldably connected side and end walls and a reinforced bottom panel designed to be collapsed into flat form and readily expanded into erected position to contain and support articles of substantial weight. Each end wall is formed by paired end wall sections foldably connected to the side wall panels. The end wall sections are foldably connected to a double ply center partition formed by a pair of center partition sections secured together in back to back relationship to provide a twin compartmented carrier. The handle part for the carrier is formed by handle extensions projecting from the upper ends of the center partition sections, with handle facing flaps folded over the handle forming extensions to provide a four ply handle part of strong and rigid construction.

An important feature of this invention is the provision of collapsible bottom reinforcing webs which integrally connect the lower end of each end wall section to the adjacent end edge of the bottom section. Each of the four bottom reinforcing webs is medially scored to provide two half sections. One of the half sections of each reinforcing web is further medially scored to provide a pair of quarter portions formed to facilitate inward folding of the web when the carrier is erected from its collapsed form. In one form of the invention the bottom panel may be additionally reinforced by the provision of a gusset which is foldably connected to one pair of adjacent webs, the gusset being medially scored to permit folding collapse of the connecting gusset along with the folding collapse of the bottom panel of the carrier.

When the carrier is erected, the two half sections of each reinforcing web are folded together and extend inwardly in overlying relation to the bottom section to which they are foldably connected, so as to provide in conjunction with the underlying bottom section a bottom wall area of three ply thickness adjacent the lower end of each end wall section. As thus formed and constructed, the article placed in each carrier compartment will rest upon and be supported by a pair of opposite infolded web sections connected to the adjacent end section and the underlying bottom section to thereby provide an article supporting bottom construction of great strength.

This bottom reinforced article carrier can be advantageously made to provide two similar compartments each designed to snugly contain and support a can or bottle of substantial weight. The carrier may be made of any desired size from a single blank of suitable paperboard or fiberboard material and is adapted to be glued and folded into assembled collapsed form in a single pass through a gluing and folding machine. If more than one article is to be placed in each of the twin compartments, cross partitions may be provided to separate the articles placed in each compartment. These improved carriers are particularly adapted for the carrier transportation of bottles and cans containing a quart or more of contents of such weight as to require a bottom construction of substantial strength which will not break or rupture in use.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which:

Fig. 1 is a plan view of a blank which has been cut and scored for assembly into a twin compartmented article carrier to incorporate the bottom reinforcing features of this invention, areas of adhesive being shown applied to certain parts thereof preliminary to the first folding operation;

Fig. 2 is a plan view of the blank shown in Fig. 1 as it would appear after completion of the first folding operation;

Fig. 3 is a plan view of the blank shown in Fig. 2 after completion of the second folding operation, adhesive being shown applied to further areas thereof preparatory to execution of the third and final folding operation;

Fig. 4 is a plan view of the fully assembled carrier in collapsed form as it would appear after execution of the third folding operation on the partially assembled blank as shown in Fig. 3;

Fig. 5 is a perspective view of the assembly carrier shown in Fig. 4 as it would appear when undergoing erection expansion;

Fig. 6 is a transverse cross section of the partially erected carrier as the same would appear when viewed along line 6—6 of Fig. 5;

Fig. 7 is a perspective view of the carrier assembled from the blank shown in Fig. 1 and as it would appear when fully expanded;

Fig. 8 is a perspective view of the fully erected carrier shown in Fig. 7 as it would appear when viewed from the open end of the carrier, this view also showing the final infolded position of the reinforcing webs thereof;

Fig. 9 is a fragmentary vertical cross section taken transversely of the erected carrier as the same would appear when viewed along line 9—9 of Fig. 8 and further showing the infolded position of the reinforcing webs;

Fig. 10 is a plan view of a modified blank which forms a twin compartmented article carrier having a reinforcing gusset associated with an adjacent pair of bottom reinforcing webs, areas of adhesive being shown applied to certain parts thereof preliminary to the first folding operation;

Fig. 11 is a plan view of the blank shown in Fig. 10 as it would appear after completion of the first folding operation, areas of adhesive being shown applied to additional areas of the blank preparatory to executing the second folding operation;

Fig. 12 is a plan view of the blank shown in Fig. 11 after completion of the second folding operation, an area of adhesive being shown applied to further areas thereof preparatory to execution of the third and final folding operation;

Fig. 13 is a plan view of the fully assembled collapsed carrier formed from the blank shown in Fig. 10 and as it would appear after execution of the third folding operation on the partially assembled blank as shown in Fig. 12;

Fig. 14 is a perspective view of the assembled carrier shown in Fig. 13 as it would appear when undergoing erection expansion;

Fig. 15 is a horizontal cross section of the partially erected carrier as the same would appear when viewed along line 15—15 of Fig. 14;

Fig. 16 is an end view of the lower portion of the partially erected carrier as it would appear when viewed from the right hand end of Figs. 14 and 15;

Fig. 17 is a vertical cross section of the lower portion of the partially erected carrier as it would appear when viewed along line 17—17 of Figs. 15 and 16;

Fig. 18 is an end view of the lower portion of the partially erected carrier as the same would appear when viewed from the left hand end of the partially erected carrier as shown in Fig. 14;

Fig. 19 is a horizontal cross section of the carrier taken along line 15—15 of Fig. 14 as it would appear at a more advanced stage of erection expansion, this view further illustrating the infolding movement of the bottom reinforcing webs;

Fig. 20 is a vertical cross section of the lower portion of the partially erected carrier as it would appear when viewed along line 20—20 of Fig. 19, this view particularly illustrating the infolding movement of the web sections and associated gusset sections during erection expansion of the carrier;

Fig. 21 is an end view of the lower portion of the partially erected carrier as viewed from the left hand end of Fig. 19 and as it would appear during the final stages of erection expansion;

Fig. 22 is a horizontal cross section of the carrier as it would appear during the final stages of erection expansion when viewed along line 22—22 of Fig. 21;

Fig. 23 is a vertical cross section of the lower portion of the carrier as it would appear when viewed along line 23—23 of Figs. 21 and 22, this view further illustrating the folding movement of the web sections and associated gusset sections during the final erection stage thereof;

Fig. 24 is a perspective view of the carrier assembled from the blank shown in Fig. 10 and as it would appear when fully erected;

Fig. 25 is a top plan view of the fully erected carrier shown in Fig. 24, this view illustrating the final infolded position of the web sections and gusset sections, with the outline of a bottle positioned in each of its compartments in supporting position on the infolded web sections;

Fig. 26 is a vertical cross section taken transversely of the erected carrier as the same would appear when viewed along line 26—26 of Fig. 25; and Fig. 27 is a longitudinal cross section taken vertically through the carrier along line 27—27 of Fig. 25.

Similar reference characters refer to similar parts throughout the several views of the drawings and specification.

In making article carriers in accordance with this invention, stock sheets of selected paperboard or fiberboard material are first printed and finished on one side thereof only and then cut and scored in a single pass through a cutting and scoring machine to provide the prepared blanks in the form shown in Figs. 1 or 10. The prepared blanks shown in Figs. 1 and 10 are designed to be formed into twin compartmented carriers particularly adapted to contain a bottle or can in each compartment.

The blanks shown in Figs. 1 and 10 each comprise a bottom panel formed by a pair of bottom sections 1 and 1' foldably connected along a medial score 21. The bottom sections 1 and 1' may be made generally square in outline to support a round or square bottle or can of corresponding size. Side wall panels 2 and 2' are foldably connected to the bottom sections 1 and 1' along parallel extending scores 22 and 22'. The end walls of both of these carriers are formed by a pair of end wall sections 3 and 3' foldably connected to the adjacent side edges of the side panels 2 and 2' along aligned scores 23 and 23', and by a pair of end wall sections 4 and 4' foldably connected to the other side edges of the side panels 2 and 2' along aligned scores 24 and 24'.

The center partition is formed by a pair of center partition sections 6 and 6' foldably connected to the end wall sections 4 and 4' along the aligned scores 26 and 26'. A pair of center partition securing flaps 5 and 5' are foldably connected to the end wall sections 3 and 3' along the aligned scores 25 and 25' and are designed to be infolded and secured to the adjacent free side edges of the inturned center partition sections 6 and 6' when the carrier is assembled.

These carriers are also provided with a handle part formed by handle extensions 7 and 7' which are integral with and project from the upper ends of the center partition sections 6 and 6'. A pair of handle reinforcing flaps 8 and 8', separated by a cut 18 from the adjacent top edge 4" of the end wall sections 4 and 4' and captured from material otherwise discarded as waste, are foldably connected at one end thereof to the adjacent handle forming extensions 7 and 7' along scores 26" which form continuations of the adjacent vertically extending scores 26 and 26'. The handle forming extensions 7 and 7' and the handle reinforcing flaps 8 and 8' may be provided with hand hole openingss 17 which fall into registry when the blanks are assembled into container form. The upper top edges 4" of the end wall sections 4 and 4' as well as the top edges 3" of the end wall sections 3 and 3' may if desired be given an attractive inclination as shown in Figs. 1, 7 and 10 and 24.

The bottom sections 1 and 1' of the blanks as shown in Figs. 1 and 10 are generally square in form, but may obviously be made in any desired length of rectangular form as desired, in which event the horizontal length of the side panels 2 and 2' and the center partition sections 6 and 6' would be of corresponding horizontal length. The bottom forming sections 1 and 1' of the blanks shown in Figs. 1 and 10 are reinforced by triangular webs 9—9' and 10—10' which are foldably connected to the lower ends of the adjacent end wall sections 3—3' and 4—4' and to the adjacent end edges of the bottom sections 1—1. The webs 9 and 9' at the upper side of the blanks as shown in Figs. 1 and 10 are in the form of isosceles triangles and are foldably connected to the adjacent end edges of the bottom sections 1 and 1' by aligned scores 23" which may also be substantially in alignment with the side panel defining scores 23 and 23' as the blanks are cut. The triangular webs 9 and 9' are also foldably connected to the bottom ends of the adjacent end wall sections 3 and 3' along the bottom edge defining scores 22" which are substantially in alignment with the scores 22 and 22' which define the bottom edge of the side panels 2 and 2'. At the lower side of the blanks as shown in Figs. 1 and 10, a similar pair of triangular webs 10 and 10' each in the form of an isosceles triangle are foldably connected to the adjacent side edges of the bottom sections 1 and 1' along the aligned side edge defining scores 24" which are also substantially in alignment with the side panel defining scores 24 and 24'. The triangular webs 10 and 10' are foldably connected to the lower ends of the adjacent end wall sections 4 and 4' along scores 22" which are also substantially in alignment with the scores 22 and 22'.

The triangular webs 9 and 9' are each divided by medial scores 27 and 27' into a pair of similar half sections 11—12 and 11'—12' respectively. The half sections 11 and 11' are joined to the adjacent end wall sections 3 and 3' by the bottom edge defining scores 22" thereof, and the other half sections 12 and 12' are foldably connected to the adjacent end edge of the bottom sections 1 and 1' by the bottom edge defining scores 23". The half sections 11 and 11' are further divided by medial scores 28 and 28' into a pair of quarter portions 13—14 and 13'—14' respectively. The bottom reinforcing webs 10 and 10' are likewise divided into paired half sections 11—12 and 11'—12' by medially extending scores 27 and 27', with the half sections 11 and 11' foldably connected to the adjacent bottom edge of the end wall sections 4 and 4' by the aligned scores 22". The other half sections 12 and 12' of the webs 10 and 10' are foldably connected by the bottom edge defining scores 24″ to the adjacent bottom sections 1 and 1′. The half sections 11 and 11′ are each divided by quarter scores 28 and 28′ into a pair of quarter portions 13—14 and 13′—14′. The medial scores 27—27′ and the quarter scores 28—28′ formed in the reinforcing webs 9—9′ and 10—10′ facilitate erection of the collapsed carrier.

In the blank shown in Fig. 1, the center partition securing flaps 5 and 5′ are provided with end extensions 5″ which project upwardly beyond the top edge 3″ of the adjacent end wall sections 3 and 3′. Edge rounding flaps 19 and 19′ may also be captured from the hand hole opening 17 cut in the handle facing flaps 8 and 8′ which may be turned upwardly when the carrier is assembled as shown in Fig. 8.

In assembling the carrier from the blank shown in Fig. 1, patches of adhesive a and a′ are first applied to the handle facing flaps 8 and 8′ and also if desired to the handle extensions 7 and 7′ of the center partition sections 6 and 6′ over an area to be covered by the adjacent handle reinforcing flaps 8 and 8′. Strips of adhesive b and b′ are also applied to the edge portions of the center partition sections 6 and 6′ as shown in Fig. 1. The end wall sections 3 and 3′ and their associated center partition securing flaps 5 and 5′ are folded along the aligned scores 23 and 23′ in superimposed relation to the adjacent side wall panels 2 and 2′ and end wall sections 4 and 4′ as shown in Fig. 2. By this folding operation the end extensions 5″ of the center partition securing flaps 5 and 5′ become adhesively secured to the adjacent end portions of the handle facing flaps 8 and 8′ and the reinforcing webs 9 and 9′ are folded along the scores 23″ in overlying relation to the bottom sections 1 and 1′ as shown in Fig. 2.

In the following folding operation, the center partition sections 6 and 6′ and their associated handle extensions 7—7′ are folded along the aligned scores 26—26′ in superimposed relation to the adjacent end wall sections 4 and 4′, the handle reinforcing flaps 8 and 8′ and the center partition flaps 5 and 5′ as shown in Fig. 3. An area c of adhesive is then applied to the entire upper face of the overfolded center partition section 6 and its handle extension 7. In the final folding operation, the blank as shown in Fig. 3 is folded along the bottom collapsing score 21 so as to place the center partition section 6′ and its associated handle extension 7′ into overlying and adhesively secured relation to the center partition section 6 and its handle extension 7, thereby completing the assembly of the carrier in collapsed form as shown in Fig. 4.

Carriers as thus constructed in collapsed form can be shipped and stored in a minimum of space ready for erection and filling as may be required. In erecting the collapsed carrier shown in Fig. 4, the side edges 23—23′ thereof may be placed against a flat surface as shown in Fig. 5 and downward pressure applied to the adjacent side edges 26—26′ of the adhesively joined center partition sections 6—6′, thereby causing expansion of the carrier. In substantially the same operation, inward pressure is applied to the outwardly projecting reinforcing webs 10—10′ so as to cause the webs to buckle inwardly along the medial collapsing scores 27—27′ as shown in Figs. 5 and 6. When the end wall sections 4 and 4′ have been fully flattened by continued downward pressure applied along the adjacent center partition scores 26—26′, the half sections 12—12′ of the reinforcing webs 10—10′ will automatically infold to overlie the inside faces of the flattened bottom half sections 1—1′, and the associated half sections 11—11′ thereof will also automatically flatten to overlie the inturned half sections 12 and 12′ of the reinforcing webs 10—10′.

It will be noted that the reinforcing webs 9—9′ already overlie the inside face of the bottom half sections 1 and 1′ when the carrier is in collapsed condition as shown in Fig. 4 and as indicated in Fig. 3. Consequently, when the collapsed carrier is expanded by the downward pressure applied to the center partition scores 26—26′ as shown in Figs. 5 and 6, the half sections 11—11′ of the reinforcing webs 9—9′ will automatically fold along the medial scores 27—27′ thereof so as to place the half sections 11—11′ of the webs 9—9′ in flattened superimposed relation to their associated half sections 12—12′ as shown in Fig. 8. Thus the collapsed carrier shown in Fig. 4 can be quickly erected by applying downward pressure on the center partition scores 26—26′ and substantially simultaneously exerting inward collapsing pressure on the reinforcing webs 10—10′ as shown in Figs. 5 and 6, with the result that both pairs of bottom reinforcing webs 9—9′ and 10—10′ are properly infolded.

In the modified blank shown in Fig. 10, the adjacent bottom reinforcing webs 10 and 10′ are joined by a connecting gusset which is divided by score 21′ into a pair of similar gusset half sections 20 and 20′, the medial dividing score 21′ being substantially in alignment with the bottom collapsing score 21. The gusset half section 20 is joined to the outer edge of the adjacent web half section 12 by a collapsing score 30 and the gusset half section 20′ is similarly joined to the outer edge of the adjacent web half section 12′ along the collapsing score 30′. The connecting gusset as thus foldably connected to the adjacent half sections 12 and 12′ of the reinforcing webs 10 and 10′ insures retention of the bottom panel in flat form when erected and provides further reinforcement for the bottom panel.

In assembling the carrier blank shown in Fig. 10, patches of adhesive d and d′ are first applied to the handle extensions 7 and 7′ of the center partition sections 6 and 6′ over an area to be covered by the adjacent handle reinforcing flaps 8 and 8′ as shown in Fig. 10. The center partition sections 6 and 6′ and their associated handle extensions 7 and 7′ are then folded along the aligned scores 26, 26′ and 26″ in superimposed relation to the adjacent side wall sections 4 and 4′ and the handle reinforcing flaps 8 and 8′ as shown in Fig. 11. Strips of adhesive e and e′ are applied to the center partition securing flaps 5 and 5′ as shown in Fig. 11 and the end wall sections 3 and 3′ are folded along the aligned scores 23 and 23′ so as to place the end wall sections 3 and 3′ in superimposed relation to the inside face of the adjacent side panels 2 and 2′, with the center partition securing flaps 5 and 5′ placed in adhesively secured relation to the free edge of the center partition sections 6 and 6′ and their associated handle extensions 7 and 7′ as shown in Fig. 12. It will be noted that in the same folding operation the reinforcing webs 9 and 9′ become folded into superimposed relation over the underlying bottom sections 1 and 1′ as shown in Fig. 12.

An area f of adhesive is then applied to the entire upper face of the overfolded center partition section 6, its handle extension 7 and the center partition securing flap 5 as shown in Fig. 12. In the final folding operation, the blank as shown in Fig. 12 is folded along the bottom collapsing score 21 and the medial gusset score 21′ so as to place the center partition section 6′, its associated handle extension 7′ and the center partition securing flap 5′ into overlying and adhesively secured relation to the center partition section 6, its handle extension 7 and the securing flap 5, thereby completing the assembly of the container in collapsed form as shown in Fig. 13. The medial gusset score 21′ insures accurate folding and placement of the center partition section 6′ and its associated handle extension 7′ and securing flap 5′ into precise registry with the corresponding center partition section 6, its handle extension 7 and securing flap 5. This is particularly important where the bottom sections 1 and 1′ of the container are substantially square in outline and where the erected height of the carrier to be formed is substantially greater than the length of the bottom forming panel.

To erect the collapsed carrier as shown in Fig. 13, the bottom collapsing score 21 is pressed inwardly, to cause the infolded end wall sections 3 and 3' to swing outwardly as shown in Figs. 14, 15 and 16. The half sections 12 and 12' of the reinforcing webs 9 and 9' will then hug the inside face of the expanding bottom sections 1 and 1', but the associated quarter portions 13—14 and 13'—14' will hinge about the medial scores 27 and 27', the bottom hinging scores 22" and their connecting quarter scores 28—28' so as to cause the quarter portions 13 and 13' to be projected inwardly of the end wall sections 3 and 3' to which they are connected as shown in Figs. 16 and 17.

As continued flattening pressure is exerted on the bottom panel, the quarter portions 13 and 13' will automatically fold over the associated half sections 12 and 12' and the quarter portions 14 and 14' will subsequently fold over their associated half sections 11 and 11' as shown in Figs. 19, 20, 21 and 22. When the bottom sections 1 and 1' have been carefully flattened, the end wall sections 3 and 3' will extend in substantially the same plane and substantially at right angles to the side panels 2 and 2' to which they are foldably connected, the half sections 12 and 12' of the bottom reinforcing webs 9 and 9' will remain flatly folded against the inside faces of the adjacent bottom sections 1 and 1', and the quarter portions 13—14 and 13' and 14' will be flattened to overlie their associated half sections 12—12' in substantially flat relation thereto.

The bottom reinforcing webs 10 and 10' of the modified carrier shown in Fig. 24 have a somewhat different folding action during expansion of the carrier, by reason of the gusset sections 20—20' which connects them. During the initial flattening movement of the bottom sections 1 and 1', the reinforcing webs 10 and 10' will fold about their medial scores 27—27' and quarter scores 28—28' and their associated quarter portions 13—14 and 13' and 14' will buckle inwardly, the reinforcing webs 10 and 10' and the connecting gusset sections 20—20' nevertheless extending outside of the bottom sections 1 and 1' as shown in Figs. 14 and 15. When the bottom sections 1 and 1' have been expanded to a point where they extend at an angle of approximately 90° to each other, a light inward pressure is exerted against the medial score 21' of the gusset sections 20—20' so as to cause the gusset sections to flex or snap inwardly as shown in Fig. 18. Inward pressure is then exerted against the medial scores 27 and 27' of the reinforcing webs 10 and 10' to thereby cause the gusset sections 20 and 20' to snap inwardly into approximate parallelism, additionally causing the web half sections 12 and 12' to extend substantially at right angles to their associated bottom sections 1 and 1', and further causing the quarter portions 13—14 and 13'—14' to flatten out to extend substantially at right angles to the end wall sections 4 and 4' as indicated in Figs. 19 and 20.

Upon the application of further flattening pressure to the bottom sections 1 and 1', the half sections 12 and 12' will fold inwardly in overlying relation to the inside face of the bottom sections 1 and 1' to which they are connected, the gusset half sections 20—20' will fold laterally to overlie the bottom sections 1 and 1' and the quarter portions 13—14 and 13' and 14' will fold inwardly in overlying relation to their associated half sections 12—12'. When the bottom sections 1 and 1' have been flattened to extend in substantially the same plane, and the end wall sections 4 and 4' will have flattened to extend in substantially the same plane and at right angles to the side panels 2 and 2', the half sections 12 and 12' of the bottom reinforcing webs 10—10' will snugly overlie the inside face of the adjacent bottom sections 1 and 1', the flattened quarter portions 13—14 and 13'—14' will extend in substantially the same plane in overlying relation to the associated half sections 12—12' and the flattened gusset sections 20—20' will directly overlie the inside face of the bottom sections 1 and 1' and extend under the center partition as shown in Fig. 25.

Twin compartmented article carriers constructed in accordance with this invention present a four ply handle part and a double ply center partition formed by the center partition sections 6 and 6' adhesively secured together in back to back relationship and foldably connected to the paired end wall sections 3—3' and 4—4'. The bottom panel as formed by the foldably connected bottom sections 1—1' and foldably joined to the lower ends of the side panels 2—2', is also foldably joined to the paired end wall sections 3—3' and 4—4' by the collapsible reinforcing webs 9—9' and 10—10'. Thus the bottom wall sections 1—1' of the article receiving compartments are reinforced by the web half sections 11—12 and 11'—12' extending inwardly in overlying relation to the bottom section of the bottom panel so as to provide a pair of inwardly extending bottom reinforcing supports upon which the opposite bottom edges of the article may rest. As thus reinforced, the bottom of this carrier will support cans and bottles weighing five pounds or more without weakening. The collapsing scores formed in the reinforcing webs are so arranged as to permit convenient and high speed gluing and folding assembly of the blank into collapsed form and to additionally facilitate high speed erection of the collapsed carrier.

While certain novel features of this invention have been disclosed herein and are pointed out in the claims, it will be understood that various omissions, substitutions and changes may be made by those skilled in the art without departing from the spirit of this invention.

What is claimed is:

1. A collapsible twin compartmented article carton formed from a single blank of sheet material which includes, a rectangular-shaped bottom panel, a pair of side panels foldably connected to the opposite side edges of the bottom panel, a pair of end panels each formed by a pair of end panel sections foldably connected to the adjacent side edges of both side panels, a center partition comprising a pair of center partition sections secured together in back to back relationship and foldably connected to the adjacent edges of both pairs of end panel sections, and a triangular-shaped bottom panel reinforcing web foldably connected to the lower end of each of said end panel sections for substantially the full width thereof and to the adjacent end edge of the bottom panel for substantially one-half the full width thereof, each of said reinforcing webs being traversed by a medial score dividing the web into a first half section integrally hinged to the bottom panel and designed to overlie said bottom panel and a second half section integrally hinged to the end panel section and designed to overlie said first half section, said second half section being further divided by a medial quartering score defining collapsible quarter sections designed to facilitate erection of the carton from its collapsed position.

2. A collapsible twin compartmented article carton formed from a single blank of sheet material which includes, a bottom panel having a longitudinal extending medial score defining a pair of similar rectangular-shaped bottom sections, a pair of side panels foldably connected to the opposite side edges of the bottom panel, a pair of end panels each formed by a pair of end panel sections foldably connected to the adjacent side edges of both side panels, a center partition comprising a pair of center partition sections secured together in back to back relationship and foldably connected to the adjacent edges of both pairs of end panel sections, and a triangular-shaped bottom panel reinforcing web foldably connected to the lower end of each of said end panel sections for substantially the full width thereof and to the adjacent end edge of the adjacent bottom section for substantially the full width thereof, each of said reinforcing webs being traversed by a medial score dividing the web into a first half section integrally hinged to the adjacent bottom half-section and designed to overlie the adjacent bottom half section and a second half section integrally hinged to the adjacent end panel section and designed to overlie said first half section, said second half section being further divided by a medial quartering score defining collapsible quarter sections designed to facilitate erection of the carton from its collapsed position.

3. A collapsible twin compartmented article carrier formed from a single blank of sheet material which includes, a bottom panel having a longitudinal extending medial score defining a pair of similar rectangular-shaped bottom sections, a pair of side panels foldably connected to the opposite side edges of the bottom panel, a pair of end panels each formed by a pair of end panel sections foldably connected to the adjacent side edges of both side panels, a center partition comprising a pair of center partition sections secured together in back to back relationship and foldably connected to the adjacent edges of both pairs of end panel sections, a four ply handle part having a hand hole opening therein formed by a handle extension projecting upwardly from each of said center partition sections and a handle facing flap foldably connected to a side edge of each of said handle extensions and secured in facing relation thereto, and a triangular shaped bottom panel reinforcing web foldably connected to the lower end of each of said end panel sections for substantially the full width thereof and to the adjacent end edge of the adjacent bottom section for substantially the full width thereof, each of said reinforcing webs being traversed by a medial score dividing the web into a first half section integrally hinged to the adjacent bottom half-section and designed to overlie the adjacent bottom half section and a second half section integrally hinged to the adjacent end panel section and designed to overlie said first half section, said second half section being further divided by a medial quartering score defining collapsible quarter sections designed to facilitate erection of the carrier from its collapsed position.

4. A collapsible twin compartmental article carrier formed from a single blank of sheet material which includes, a bottom panel having a longitudinal extending medial score defining a pair of similar rectangular-shaped bottom sections, a pair of side panels foldably connected to the opposite side edges of the bottom panel, a pair of end panels each formed by a pair of end panel sections foldably connected to the adjacent side edges of both side panels, a center partition comprising a pair of center partition sections secured together in back to back relationship and foldably connected to the adjacent edges of both pairs of end panel sections, a four ply handle part having a hand hole opening therein formed by a handle extension projecting upwardly from each of said center partition sections and a handle facing flap foldably connected to a side edge of each of said handle extensions and secured in facing relation thereto, a triangular-shaped bottom panel reinforcing web foldably connected to the lower end of each of said end panel sections for substantially the full width thereof and to the adjacent end edge of the adjacent half section for substantially the full width thereof, each of said reinforcing webs being traversed by a medial score dividing the web into a first half section integrally hinged to the adjacent bottom half-section and designed to overlie the adjacent bottom half section integrally hinged to the adjacent end panel section and a second half section designed to overlie said first half section, said second half section being further divided by a medial quartering score defining collapsible quarter sections designed to facilitate erection of the carrier from its collapsed position, and a connecting gusset integrally hinged by a pair of folding scores to an adjacent pair of said first half sections, said connecting gusset being traversed by a medial score.

5. A one-piece twin compartmented carton forming blank which includes, a bottom panel having a longitudinal extending medial score defining a pair of similar rectangular-shaped bottom sections, a pair of side panels foldably connected to the opposite side edges of the bottom panel, a pair of end panel sections foldably connected to the opposite side edges of both said side panels, a pair of center partition sections foldably connected to the adjacent side edges of one pair of opposite end panel sections, a pair of center partition securing flaps foldably connected to the adjacent side edges of the other pair of opposite end panel sections, and a triangular-shaped bottom panel reinforcing web foldably connected to the lower end of each of said end panel sections for substantially the full width thereof and to the adjacent end edge of the adjacent bottom half section for substantially the full width thereof, each of said reinforcing webs being traversed by a medial score dividing the web into a first half section integrally hinged to the adjacent bottom half-section and a second half section integrally hinged to the adjacent end panel section, said second half section being further divided by a medial quartering score defining collapsible quarter sections.

6. A one-piece twin compartmental article carrier forming blank which includes, a bottom panel having a longitudinal extending medial score defining a pair of similar rectangular-shaped bottom sections, a pair of side panels foldably connected to the opposite side edges of the bottom panel, a pair of end panel sections foldably connected to the opposite side edges of both of said side panels, a pair of center partition sections foldably connected to the adjacent side edges of one pair of opposite end panel sections, a pair of center partition securing flaps foldably connected to the adjacent side edges of the other pair of opposite end panel sections, a handle forming extension projecting upwardly from each of said center partition sections, a handle facing flap foldably connected to a side edge of each of said handle extensions and captured from material separated from the upper edge of the adjacent end panel section, and a triangular shaped bottom panel reinforcing web foldably connected to the lower end of each of said end panel sections for substantially the full width thereof and to the adjacent end edge of the adjacent bottom half section for substantially the full width thereof, each of said reinforcing webs being traversed by a medial score dividing the web into a first half section integrally hinged to the adjacent bottom half-section and a second half section integrally hinged to the adjacent end panel section, said second half section being further divided by a medial quartering score defining collapsible quarter sections.

7. A one-piece twin compartmented article carrier forming blank which includes, a bottom panel having a longitudinal extending medial score defining a pair of similar rectangular-shaped bottom sections, a pair of side panels foldably connected to the opposite side edges of the bottom panel, a pair of end panel sections foldably connected to the opposite side edges of both of said side panels, a pair of center partition sections foldably connected to the adjacent side edges of one pair of opposite end panel sections, a pair of center partition securing flaps foldably connected to the adjacent side edge of the other pair of opposite end panel sections, a handle forming extension projecting upwardly from each of said center partition sections, a handle facing flap foldably connected to a side edge of each of said handle extensions and captured from material separated from the upper edge of the adjacent end panel section, a triangular-shaped bottom panel reinforcing web foldably connected to the lower end of each of said end panel sections for substantially the full width thereof and to the adjacent end edge of the adjacent bottom half section for substantially the full width thereof, each of said reinforcing webs being traversed by a medial score dividing the web into a first half section integrally hinged to the adjacent bottom half-section and a second half section integrally hinged to the adjacent end panel section, said second half section being further divided by a medial quartering score defining collapsible quarter sections, and a connecting gusset integrally hinged by a pair of folding scores to an adjacent pair of first half sections, said connecting gusset being traversed by a medial score.

References Cited in the file of this patent

UNITED STATES PATENTS

| | | |
|---|---|---|
| 1,947,199 | Goodnow | Feb. 13, 1934 |
| 2,535,741 | Lighter | Dec. 26, 1950 |
| 2,606,711 | Forrer | Aug. 12, 1952 |
| 2,616,611 | Arneson | Nov. 4, 1952 |